United States Patent Office 2,746,900
Patented May 22, 1956

2,746,900

HYPNOTIC AGENT AND METHOD OF MAKING THE SAME

Abraham Bavley, Brooklyn, and William M. McLamore, Flushing, N. Y., assignors to Chas. Pfizer & Co., Inc., Brooklyn, N. Y., a corporation of Delaware No Drawing. Application April 20, 1953, Serial No. 349,938

7 Claims. (Cl. 167—52)

This invention relates to certain organic compounds useful in inducing hypnosis in animals and in protecting them against convulsive seizures, to processes for the production of such compounds, and to therapeutic compositions containing the same.

While the various substances are known to induce hypnosis and related effects in animals, many such substances are deficient in one or more respects. For example, certain of them require rather large doses to induce any appreciable degree of hypnosis. Others exhibit undersirable side- or after-effects and some are sufficiently toxic to necessitate great care in their use. Furthermore, some also induce on continued use a degree of dependence which approaches habituation.

We have found that these deficiencies can be substantially overcome by employment of a certain class of halogen substituted vinyl ethinyl tertiary carbinols which are exceptionally effective in hypnotic and/or anticonvulsant activities. The compounds of this class may be designated by the following structural formula:

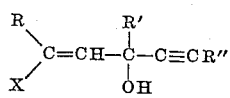

wherein R is hydrogen or an alkyl group of from 1 to 6 carbon atoms; R' is an alkyl group of from 1 to 7 carbon atoms, preferably an ethyl group; R" is hydrogen, an alkyl group of from 1 to 6 carbon atoms, or halogen, preferably chlorine or bromine; and X is halogen, preferably chlorine or bromine.

The presence of a halogen atom (X) on the terminal vinyl carbon atom appears to confer unusual hypnotic activity on these compounds. While the derivatives of this class wherein R' is a methyl group are quite useful in this respect, we have found those compounds where R' is ethyl to be particularly useful.

The above compounds are prepared by treating a halogenated vinyl ketone of the general formula

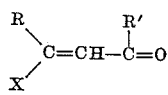

R, R' and X being as defined above, with an alkali metal salt of an acetylenic compound, preferably a lithium acetylide having the formula LiC≡CR", R" being hydrogen or an alkyl group of 1 to 6 carbon atoms. Where R" in the final vinyl ethinyl tertiary carbinol product is to be halogen, the product of this reaction is further treated with an alkaline, aqueous hypohalite solution in accordance with the procedure described and claimed in the copending patent application Serial No. 329,088, filed December 31, 1952, by Abraham Bavley et al.

The above halogenated vinyl ketones may in turn be prepared by methods well known in the art, such as by condensation of an appropriate acid chloride with acetylene or an alkyl substituted acetylene in the presence of a Friedel-Crafts catalyst. Such a method is described by Price et al., JACS, vol. 72, p. 2613 (1950); another suitable method is set forth in British Patent 461,080 to I. G. Farben Industrie, accepted February 9, 1937.

The following are illustrative of the halogenated vinyl ketones which can be employed to prepare the compounds of this invention:

Methyl β-chlorovinyl ketone
Ethyl β-chlorovinyl ketone
Propyl β-chlorovinyl ketone
Heptyl β-chlorovinyl ketone
Methyl β-chloropropenyl ketone
Ethyl β-chloroöctenyl ketone
Propyl β-chloroheptenyl ketone
Butyl β-bromobutenyl ketone
Hexyl β-bromopentenyl ketone
Heptyl β-bromohexenyl ketone Such ketones are caused to react with the lithium acetylide in the presence of liquid ammonia which acts as a solvent for the reaction. While other alkali metal acetylides can be employed, we have found that better yields are obtained, and the formation of undesirable vinyl ketone polymers can be avoided more readily with a lithium acetylide. Such acetylides are conveniently prepared in situ by passing an acetylenic hydrocarbon into a solution of lithium in liquid ammonia. The ketone is then added alone or dissolved in a dry, non-reactive solvent, such as ether, and the mixture stirred under reflux conditions. Approximately equimolecular proportions of ketone and acetylide are employed, a slight excess of the acetylide being preferred.

After from 2 to 6 hours more solvent may be added to facilitate recovery of the product, and the ammonia is removed by evaporation. The mixture is then poured into ice water and treated with a sufficient amount of a weak acid to neutralize the alkali metal hydroxide thus formed. Thereafter, the product is separated from the solvent extract and purified by distillation.

Halogenation of the reactive acetylenic carbon atom can then be accomplished by treatment of the product with an alkaline, aqueous hypohalite solution. A stable, water-immiscible organic solvent may be used for the carbinol if desired. In general, this reaction is conducted by adding the unsaturated carbinol to the alkaline hypohalite solution at room temperature or somewhat lower. The reaction time may vary from a few minutes to several hours and care should be taken that it does not proceed for too long a period. Generally, at least one and one half mols of hypohalite per mole of the carbinol are employed for best results. The aqueous solution should be approximately 2-normal with respect to the alkaline agent used. Preferably this agent is an alkali metal hydroxide, such as potassium hydroxide or lithium hydroxide.

The preparation of the compounds of this invention may be further understood from the following examples which are given by way of illustration and are not intended as a limitation of the invention.

EXAMPLE I

*5-chloro-3-ethylpent-1-yne-4-ene-3-ol*
(ethyl β-chlorovinyl ethinyl carbinol)

Acetylene was passed into a stirred soultion of 3.05 grams (0.44 mol) of lithium in 300 ml. of liquid ammonia until the blue color exhibited by the mixture had disappeared. Ethyl β-chlorovinyl ketone (47.4 grams; 0.40 mol) dissolved in 50 ml. dry ether was then added to the resulting solution of lithium acetylide over a period of 20 minutes, during which the color deepened through yellow to reddish-brown. The mixture was stirred under reflux maintained with a Dry Ice condenser for 2 hours. Thereafter, dry ether (200 ml.) was added and the ammonia was permitted to evaporate with stirring overnight. The residue was poured into a slurry of ice and water containing 30 grams (0.50 mol) of acetic acid. After separating the ether layer, the aqueous layer was washed with two 200 ml. portions of ether. The combined ether extracts were washed with saturated sodium bicarbonate solution, dried over anhydrous magnesium sulfate and evaporated in a stream of pure nitrogen. Three successive distillations of the residue gave 46.3 grams (80.2% yield) of a colorless liquid, boiling point 28.5–30° C. at 0.1 mm. Hg.; $n_D^{25}=1.4780$; $D_4^{20}=1.064$.

*Analysis.*—Calcd. for $C_7H_9OCl$: C=58.14; H=6.27. Found: C=58.03; H=6.15.

EXAMPLE II

*5-chloro-3-methylpent-1-yne-4-ene-3-ol*

*(methyl β-chlorovinyl ethinyl carbinol)*

Methyl β-chlorovinyl ketone (42.8 grams; 0.41 mol) was condensed with lithium acetylide in accordance with the procedure of Example I to obtain the above product as a colorless liquid, boiling point 68° C. at 15 mm. Hg, in 65% yield; $n_D^{25}=1.4758$; $D_4^{20}=1.068$.

*Analysis.*—Calcd. for $C_6H_7OCl$: C=55.19; H=5.40. Found: C=55.34; H=5.52.

EXAMPLE III

*5-chloro-3-n-propylpent-1-yne-4-ene-3-ol*

*(n-propyl β-chlorovinyl ethinyl carbinol)* n-Propyl β-chlorovinyl ketone (53.0 grams; 0.040 mol), when treated as in Example I, yielded the above compound, which after two distillations was recovered as a colorless liquid, boiling point 43–44° C. at 0.5 mm. Hg; $n_D^{25}=1.4754$; $D_4^{20}=1.043$.

*Analysis.*—Calcd. for $C_8H_{11}OCl$: C=60.57; H=6.99. Found: C=60.69; H=6.98.

EXAMPLE IV

*1-bromo-5-chloro-3-ethylpent-1-yne-4-ene-3-ol*

*(ethyl β-chlorovinyl bromoethinyl carbinol)*

The product of Example I (21.7 grams; 0.15 mol 5-chloro-3-ethylpent-1-yne-4-ene-3-ol) was treated with a hypohalite solution prepared by dissolving 12.5 cc. of bromine in a cold aqueous solution of 90 grams potassium hydroxide in 400 cc. of water. This mixture was stirred vigorously for ½ hour and extracted with ether from which the above compound was recovered in 84.9% yield as a colorless liquid, boiling point 54° C. at 0.025 mm. Hg. Crystallization from petroleum ether gave colorless prisms melting at 41–42° C.

*Analysis.*—Calcd. for $C_7H_8OClBr$: C=37.61; H=3.61. Found: C=37.31; H=3.57.

In general, the compounds of this invention are colorless liquids or solids which are readily adapted for therapeutic use. Marked hypnosis was observed in animals to which they had been administered. Furthermore, the compounds were found to protect such animals effectively against convulsive seizures. This permits certain treatment of animals which would not be possible without the use of a hypnotic agent. The toxicity of the compounds was found to be quite low when they were administered to mice in amounts sufficient to achieve the desired results, and no harmful pharmacological effects were observed as a result of such administration.

The above compounds may be employed in a variety of medicinal dosage forms, that is, they may be incorporated with various inert pharmaceutical carriers such as solid diluents, oils, etc., or with other biologically active materials, in the form of capsules, elixirs, injectable solutions and the like. Materials for oral administration may be sweetened and flavored with various materials of the type normally employed for that purpose.

When incorporated in such medicinal dosage forms the compounds may be present in concentrations ranging from about 0.5% by weight to about 90% by weight of the composition. Lower concentrations are generally not advisable since the volume of material which must be administered becomes excessive.

Resort may be had to such modifications and equivalents as fall within the scope of the invention and the scope of the appended claims.

We claim:

1. A compound having the following structure:

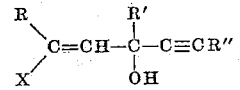

wherein R is selected from the group consisting of hydrogen and alkyl groups of from 1 to 6 carbon atoms; R' is an alkyl group of from 2 to 7 carbon atoms; R" is selected from the group consisting of hydrogen, alkyl groups of from 1 to 6 carbon atoms and halogen; and X is halogen.

2. A product in accordance with claim 1 wherein R and R" are hydrogen, R' is an alkyl group of from 2 to 7 carbon atoms, and X is halogen.

3. 5-chloro-3-ethylpent-1-yne-4-ene-3-ol.

4. 5-chloro-3-n-propylpent-1-yne-4-ene-3-ol.

5. A process for the preparation of a halogenated pent-yne-ene-ol, which comprises treating a compound having the formula:

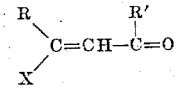

where R is selected from the group consisting of hydrogen and alkyl groups of from 1 to 6 carbon atoms, R' is an alkyl group of from 1 to 7 carbon atoms, and X is halogen, with a lithium acetylide in the presence of liquid ammonia.

6. A composition comprising a pharmaceutical carrier and from about 0.5% to about 90% of a compound having the following formula:

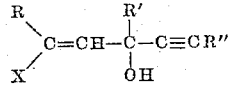

wherein R is selected from the group consisting of hydrogen and alkyl groups of from 1 to 6 carbon atoms; R' is an alkyl group of from 1 to 7 carbon atoms; R" is selected from the group consisting of hydrogen, alkyl groups of from 1 to 6 carbon atoms and halogen; and X is halogen.

7. A therapeutically effective hypnotic composition comprising not less than 0.5% of 5-chloro-3-methylpent-1-yne-4-ene-3-ol and a pharmaceutical carrier therefor.

References Cited in the file of this patent

UNITED STATES PATENTS

| | | |
|---|---|---|
| 1,841,768 | Straus | Jan. 19, 1932 |
| 2,425,201 | Oroshnik | Aug. 5, 1947 |
| 2,455,261 | Milas | Nov. 30, 1948 |

FOREIGN PATENTS

| | | |
|---|---|---|
| 665,147 | Great Britain | Jan. 16, 1952 |

OTHER REFERENCES

Johnson: Chemistry of Acetylenic Compounds, vol. (1946), pp. 12, 13.

Papa: Archives of Biochemistry and Biophysics, vol. 33, October 1951, pp. 482, 483.

Price et al.: J. A. C. S., volume 72, pages 2613 to 2615, June 1950.